T. H. QUICK.
Purifying Bone Black.

No. 54,771.

Patented May. 15, 1866.

UNITED STATES PATENT OFFICE.

THOMAS H. QUICK, OF NEW YORK, N. Y.

IMPROVEMENT IN PURIFYING BONE-BLACK.

Specification forming part of Letters Patent No. 54,771, dated May 15, 1866.

*To all whom it may concern:*

Be it known that I, THOMAS H. QUICK, of No. 118 King street, of the city, county, and State of New York, have invented a new and useful Improvement in Purifying Animal Coal; and I do hereby declare that the following is a full, clear, and exact description thereof, which will enable others skilled in the art to make and use the same, reference being had to the accompanying drawings, forming part of this specification, in which—

Figure 1:
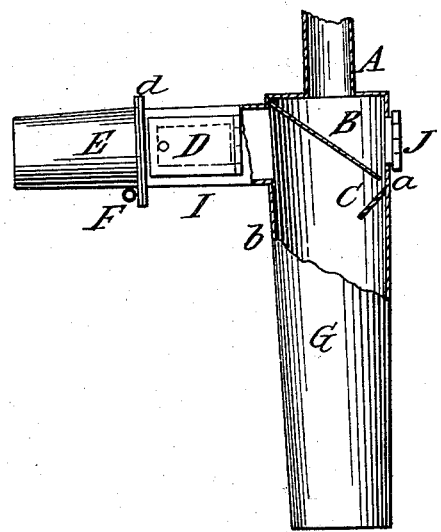
Figure 2:
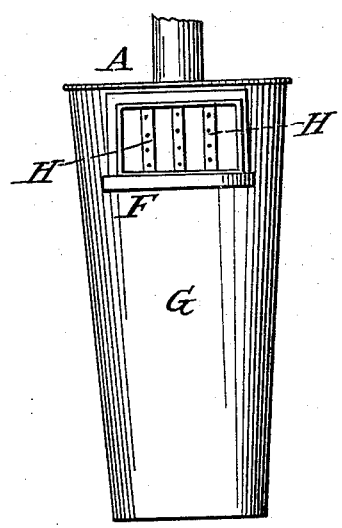

Figure 1 represents a side view, partly in section, of an apparatus made according to my invention. Fig. 2 represents an end elevation.

Similar letters of reference indicate like parts.

In refining sugar where animal coal or bone-black is used in the process it is customary after the sirup or liquor has been filtered through the mass of coal to reburn the coal in order to destroy the impurities collected in it from the liquor, and thus prepare it for being used again for filtering; but before the said coal can be used again the dust and impurities found therein, and such as are produced in the process of combustion, should be removed, because if they are allowed to remain great damage results to the sugar.

The devices and means used hitherto for removing the dust and other impurities from animal coal have not been efficient, because they have not sufficed to remove the impurities and foreign substances present therein after reburning.

This invention consists in a novel construction of apparatus for treating the reburned coal by the use of which dust and other impurities are efficiently removed and the same collected in a receiver, so as not to be allowed to float through the atmosphere. Heretofore great complaints have been made by families residing in the vicinity of sugar-refineries against the clouds of dust which often fill the air and settle upon the grounds and upon articles exposed in the air, thereby inflicting much loss and inconvenience upon laundresses and others. These complaints have threatened to effect the removal of sugar-refineries from inhabited to uninhabited places, and their removal to such places would result in increased cost of carriage and labor and in diminished facilities for business.

My invention does away with these complaints by removing their cause.

The apparatus by means of which I carry out my invention is represented in the accompanying drawings. The form and the several details thereof may be changed in many ways without departing from the principle of my invention; but I have selected the form and details here shown for the illustration of my invention because I have obtained good results therefrom.

A designates a feed pipe or tube through which the freshly-burned bone-black is delivered into the wide flue G. The flue G is, in this example, made elliptical, or, rather, it is shaped like a flattened cylinder, its breadth being gradually contracted, as seen in Fig. 2.

B is an inclined diaphragm fixed in the upper part of the flue, beneath the feed-pipe A. It does not quite reach across the flue, but leaves a narrow space between its lower edge and the adjoining side $a$ of the flue, through which the coal or bone-black falls in its descent.

C is a narrow shelf secured to the side of the flue directly beneath the said space and inclined downward in a direction about at right angles to the plane of the diaphragm B.

The object of this construction is to cause the currents of bone-black to be deflected from the side $a$ of the flue in a shower which shall be nearly as possible horizontal, or which, in other words, shall reach toward the other side of the flue, so that the bone-black will become separated and be subjected under the most favorable circumstances to the action of currents of air to be brought or forced up said flue, as is hereinafter mentioned.

To the side $b$ of the flue G, near its top, I connect a pipe, I, in one of whose sides I place a door, D, for the purpose of enabling the workmen to clean the apparatus in the parts D and E.

To the end of the tube I, I attach a steam-blower, designated by the letter E, of the kind called "Hancock's steam-blower," $d$ being the line of the joint between the blower and tube I.

F designates a steam-pipe leading from a suitable reservoir or place of supply of steam, and H H H designate steam-distributing pipes placed within and across the blower E, having holes opening outward for the discharge of steam. These pipes receive steam from the outer pipe, F.

Since I lay no claim to the construction of the blower in itself considered, it is not necessary for me to describe it more definitely. The discharge end of the blower is to open into any suitable receiver such as is now used in sugar-refineries for receiving the dust drawn from the coal or any other which may be preferred. The receiver may open to the atmosphere.

The operation of the apparatus is as follows: Steam being discharged through the distributing-pipes H, a current of air is induced through the bottom of the flue G upward into the lateral tube I, and so through the blower E. The bone-black to be treated being now suffered to descend through the feed-pipe A, will fall upon the inclined diaphragm B and be carried thence by its gravity onto the narrow plate C, whence it will shoot over in a shower or in a scattered condition toward the side b of the flue, thereby becoming exposed to the action of the upward current of air. By this means the dust and any impurities in the coal will be separated from the coal and will be carried upward with the air through the blower, and will eventually be delivered with the steam into any receiver which may be placed before the discharge end of the blower.

The condensation of the steam will, moreover, moisten the mass of dust and impurities so that they will lose their volatile character and fall upon the ground or upon the bottom of the receiver instead of flying off into the atmosphere, as before explained.

It will be observed that the flue G is enlarged above and contracted below. The object of this construction is to permit the currents of coal to expand to the utmost when first exposed to the air-currents, and also to allow the air-currents to expand after they have entered the flue, and so avoid the liability of having them carry up before them any solid particles of coal.

The object of the door J is to give facility to the workmen in removing any obstructions which may lodge in the space below the diaphragm B.

I claim as new and desire to secure by Letters Patent—

1. The flue G for receiving the descending currents of animal coal or bone-black, constructed substantially as and for the purpose above described, with the diaphragm B and shelf C, in combination with the feed-pipe A.

2. The combination of the flue G with a "Hancock steam-blower," arranged substantially as and for the purpose above described.

THOS. H. QUICK.

Witnesses:
M. M. LIVINGSTON,
C. L. TOPLIFF.